(12) United States Patent
Borkovsky et al.

(10) Patent No.: US 7,440,941 B1
(45) Date of Patent: Oct. 21, 2008

(54) SUGGESTING AN ALTERNATIVE TO THE SPELLING OF A SEARCH QUERY

(75) Inventors: Arkady Borkovsky, San Francisco, CA (US); Chad Carson, Redwood City, CA (US); Marco Zagha, Belmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 475 days.

(21) Appl. No.: 10/364,078

(22) Filed: Feb. 10, 2003

Related U.S. Application Data

(60) Provisional application No. 60/413,092, filed on Sep. 23, 2002, provisional application No. 60/411,535, filed on Sep. 17, 2002.

(51) Int. Cl.
  G06F 7/00 (2006.01)
  G06F 17/30 (2006.01)
  G06F 17/00 (2006.01)
(52) U.S. Cl. .................................. 707/5; 707/4; 715/257
(58) Field of Classification Search ...................... 707/2, 707/3, 4, 5; 715/533
See application file for complete search history.

(56) References Cited

U.S. PATENT DOCUMENTS

| | | | |
|---|---|---|---|
| 5,258,909 A * | 11/1993 | Damerau et al. ............. | 714/533 |
| 5,987,457 A | 11/1999 | Ballard | |
| 6,047,299 A | 4/2000 | Kaijima | |
| 6,144,958 A * | 11/2000 | Ortega et al. .................... | 707/5 |
| 6,212,517 B1 * | 4/2001 | Sato et al. ....................... | 707/5 |
| 6,385,350 B1 * | 5/2002 | Nicholson et al. ........... | 382/309 |
| 6,411,950 B1 | 6/2002 | Moricz et al. | |
| 6,421,675 B1 * | 7/2002 | Ryan et al. ................... | 707/100 |
| 6,460,037 B1 | 10/2002 | Weiss et al. | |
| 6,564,213 B1 * | 5/2003 | Ortega et al. .................... | 707/5 |
| 6,701,309 B1 * | 3/2004 | Beeferman et al. ............. | 707/3 |
| 6,772,150 B1 * | 8/2004 | Whitman et al. ............... | 707/6 |
| 6,883,001 B2 | 4/2005 | Abe | |
| 7,127,450 B1 | 10/2006 | Chang et al. | |
| 7,146,358 B1 | 12/2006 | Gravano et al. | |
| 7,194,684 B1 * | 3/2007 | Shazeer ...................... | 715/533 |
| 7,254,773 B2 * | 8/2007 | Bates et al. .................. | 715/533 |
| 2002/0059220 A1 | 5/2002 | Little | |
| 2002/0194229 A1 | 12/2002 | Decime et al. | |

(Continued)

OTHER PUBLICATIONS

Brett_Tabke ("The Google FAQ by Webmasters for Webmasters", http://referencementweb.hautetfort.com/files/google_kbase.pdf, Apr. 23, 2002).*

(Continued)

*Primary Examiner*—Hosain T Alam
*Assistant Examiner*—Shew-Fen Lin
(74) *Attorney, Agent, or Firm*—Hickman Palermo Truong & Becker LLP; Christian A. Nicholes

(57) ABSTRACT

A method and apparatus for suggesting an alternative spelling for a search query is provided. A request to search for files that match the search query is received. The alternative spelling is selected based on a set of factors. According to one aspect, the set of factors includes how frequently the alternative spelling occurs in a plurality of files. According to one aspect, the set of factors includes how frequently the alternative spelling occurs in one or more previously received requests to search for files.

14 Claims, 8 Drawing Sheets

---

102
RECEIVE A REQUEST TO SEARCH FOR FILES THAT MATCH A SEARCH QUERY

↓

104
SELECT AN ALTERNATIVE SPELLING BASED ON A SET OF FACTORS, INCLUDING HOW FREQUENTLY THE ALTERNATIVE SPELLING OCCURS IN A PLURALITY OF FILES, AND HOW FREQUENTLY THE ALTERNATIVE SPELLING OCCURS IN ONE OR MORE PREVIOUSLY RECEIVED REQUESTS TO SEARCH FOR FILES

↓

106
PRESENT THE ALTERNATIVE SPELLING TO A USER

U.S. PATENT DOCUMENTS

2003/0208482 A1* 11/2003 Kim et al. .................. 707/3
2004/0098385 A1*  5/2004 Mayfield et al. ............. 707/3
2005/0149499 A1   7/2005 Franz et al.
2006/0294067 A1  12/2006 Halcrow et al.

OTHER PUBLICATIONS

Bookface-ga ("Search Term Suggestion Tool available", http://answers.google.com/answers/threadview?id=18072, May 25, 2002.*

Google, "Google Search: Silicone Valley," http:///www.google.com/search?hl=em&ie=UTF-8&oe=UTF-8&=Silicon+Valley, printed May 12, 2003, pp. 1-2.

Tabke, Brett, "The Google FAQ by Webmasters for Webmasters", Http://referencementweb.hautefort.com/files/google_kbase.pdf, Apr. 2002, 32 pages.*

Bookface-Ga, "Search Term Suggestion Tool Available", http://answers.google.com/answers/threadview?id=18072, May 2002, 2 pages.*

* cited by examiner

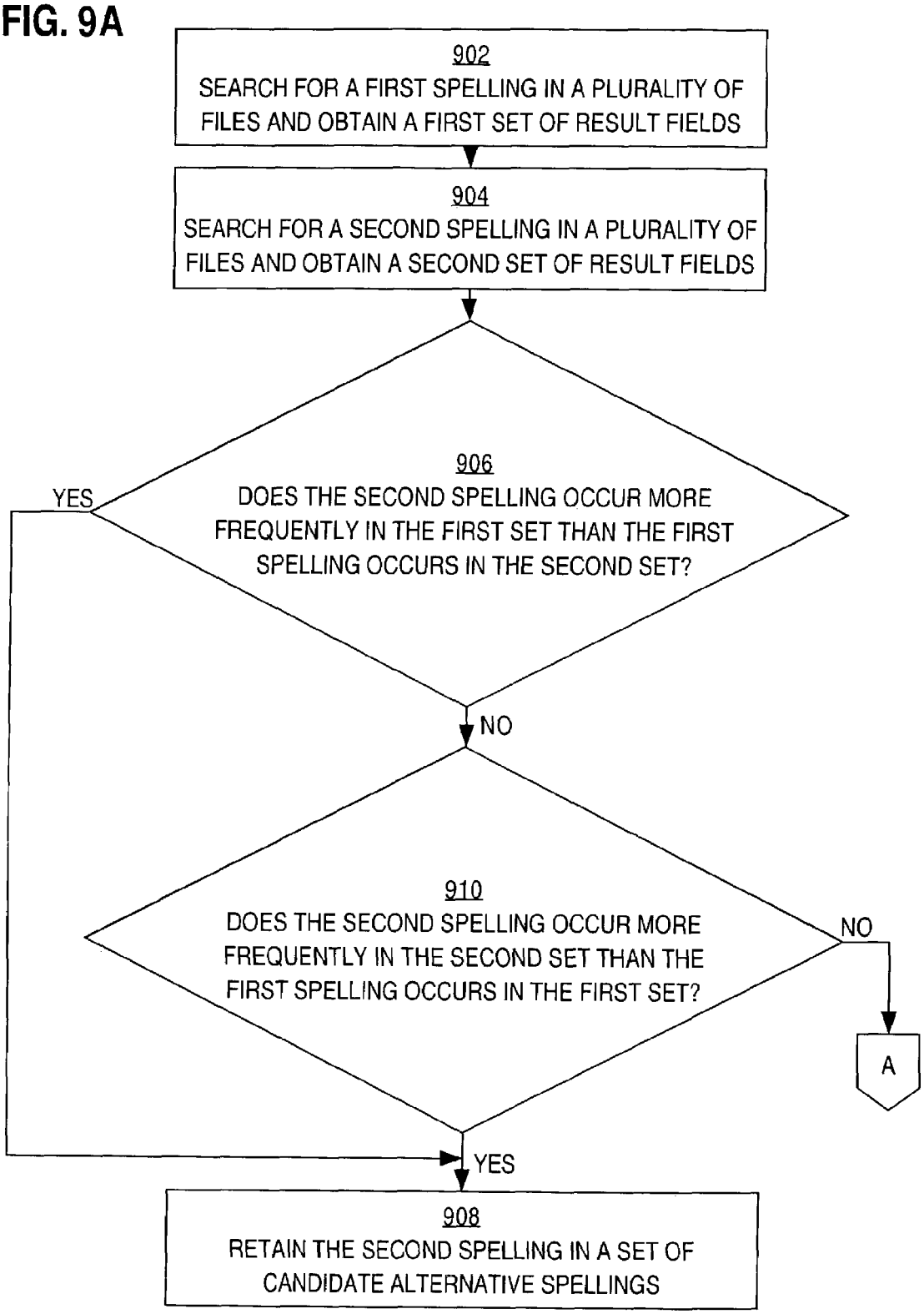

US 7,440,941 B1

SUGGESTING AN ALTERNATIVE TO THE SPELLING OF A SEARCH QUERY

CLAIM OF PRIORITY

The present application claims priority to the following provisional U.S. patent applications, the entire contents of which are incorporated herein for all purposes:

U.S. Provisional Patent Application No. 60/411,535, entitled "SPELLING IN WEB SEARCH", filed Sep. 17, 2002; and U.S. Provisional Patent Application No. 60/413,092, entitled "SPELLING IN WEB SEARCH", filed Sep. 23, 2002.

FIELD OF THE INVENTION

The present invention relates to search engines, and in particular, to suggesting an alternative spelling for a search query.

BACKGROUND OF THE INVENTION

A search engine is a computer program that helps a user to locate information. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

Some search engines order a list of files before presenting the list to a user. To order a list of files, a search engine may assign a rank to each file in the list. When the list is sorted by rank, a file with a relatively higher rank may be placed closer to the head of the list than a file with a relatively lower rank. The user, when presented with the sorted list, sees the most highly ranked files first. To aid the user in his search, a search engine may rank the files according to relevance. Relevance is a measure of how closely the subject matter of the file matches query terms.

To find the most relevant files, search engines typically try to select, from among a plurality of files, files that include many or all of the words that a user entered into a search request. Unfortunately, the files in which a user may be most interested are too often files that do not literally include the words that the user entered into the search request. If the user has misspelled a word in the search request, then the search engine may fail to select files in which the correctly spelled word occurs.

Worse yet, a user may enter, into a search request, a word that is a correctly spelled word, but that is not the word that means the thing for which the user desires to search. For example, a user who wants to find files that include information about "Silicon Valley" may, through ignorance or by accident, request a search for "Silicone Valley". Because "Silicone" is a correctly spelled word, a spelling checking program will not detect any error. Under such circumstances, the user is likely to obtain a list of results that have little to do with what the user was actually looking for.

A user may successfully enter a search request that includes correctly spelled words that are used in the correct context. Even in this case, a search engine may fail to return many existing files that include information in which the user would be very interested. Search results may be under-inclusive for a variety of reasons. A verb in the search request may be in a different verb tense than the verbs contained in the files. A noun in the search request may be expressed in the plural form while the nouns in the files are expressed in the singular form. A word may have more than one correct spelling, and the spelling used in the files might be different than the spelling that the user selected. The words included in the files may be synonyms of the words that the user entered into the search request. For any of these or other reasons, a search engine may return sub-optimal results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Techniques are provided for suggesting an alternative spelling for a search query. According to one embodiment, when a request to search for files that match the search query is received, an alternative spelling is selected based on a set of factors. According to one aspect, the set of factors includes how frequently the alternative spelling occurs in a plurality of files. According to another aspect, the set of factors includes how frequently the alternative spelling occurs in one or more previously received requests to search for files. The alternative spelling may then be presented to the user who submitted the original request, to allow the user to perform a modified search based on the alternative spelling. Alternatively, instead of presenting the alternative spelling to a user, the alternative spelling may be automatically substituted for the search query without input from the user.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 9A and 9B are flow diagrams that illustrate a technique, according to an embodiment of the present invention, for determining whether to retain or remove a first candidate alternative spelling from a set of candidate alternative spellings based on how frequently the first candidate alternative spelling occurs in result fields obtained from a search for a second candidate alternative spelling.

DETAILED DESCRIPTION OF THE INVENTION

A method and apparatus for suggesting an alternative spelling to a search query is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Figure 1:
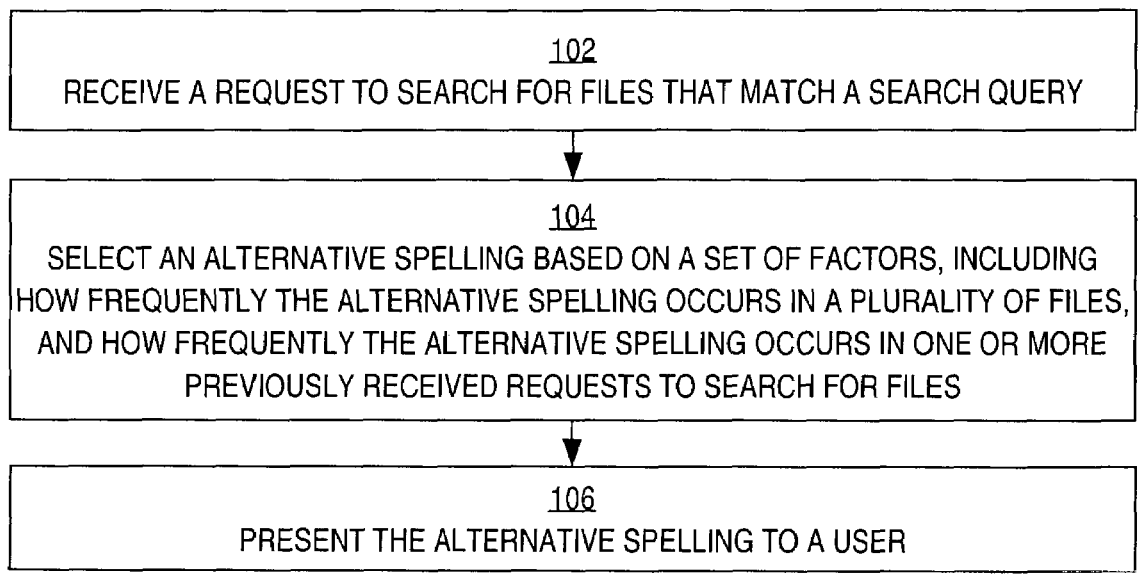
FIG. 1 is a flow diagram that illustrates a technique, according to an embodiment of the present invention, for suggesting an alternative spelling to a search query.

It is contemplated that this technique, and all of the techniques described herein, may be applied to sequences of words (i.e., phrases) as well as to individual words. FIG. 1 is a flow diagram that illustrates a technique, according to an embodiment of the present invention, for suggesting an alternative spelling to a search query. In block 102, a request is received. The request is to search for files that match a search query. The request may be to search for files that contain several specific words. The plurality of files that are considered during the search may include one or more pages that are accessible through the Internet. For example, an Internet search engine may receive, from a user, a request to search for pages that contain the word "Silicon".

In block 104, an alternative spelling is selected. As used herein, "spelling" refers to a particular spelling of one or more words. Thus, two different spellings may be two completely different words or sequences of words, or two different words or sequences of words that are spelled similarly to, but not exactly the same as, each other. As used herein, a "word" may be either a word that occurs in a natural language, such as English, or a special notation, such as a product code, URL, or ISBN. For example, the word "http:" is often misspelled as "htpp:". The alternative spelling is selected based on a set of factors. The set of factors may include how frequently the alternative spelling occurs in the plurality of files. The set of factors may include how frequently the alternative spelling occurs in one or more previously received requests to search for files. The alternative spelling may be similar to the corresponding part of the original query for which the alternative spelling is selected. For example, the alternative spelling may be spelled similarly to the corresponding part of the original query. For another example, the alternative spelling may be pronounced similarly to the corresponding part of the original query. For yet another example, the alternative spelling may be synonymous to the corresponding part of the original query. The alternative spelling may be selected from among a set of candidate alternative spellings. A different alternative spelling may be selected for each different corresponding part of a search query. While in one embodiment, only one alternative spelling is selected for each corresponding part of the original query, in an alternative embodiment, more than one alternative spelling may be selected for each corresponding part of the original query. Furthermore, multiple words may be selected as an alternative spelling of a single word, and vice-versa. In other words, words in spellings may be split or joined. For example, the spelling "New York" may be selected as an alternative to the spelling "Newyork."

For example, the search engine may submit the search query to a spelling checking routine. In response, the spelling checking routine may consult a stored dictionary file of spellings and return one or more alternative spellings that are spelled similarly to, but not exactly the same as, the submitted search query. The search engine may then determine how frequently one or more words from each alternative spelling occurs in the Internet pages. In making this determination, the search engine may consult a pre-generated index of spellings that indicates, for each spelling, how frequently that spelling occurs in a set of Internet pages that has been analyzed for spelling frequency. The more frequently an alternative spelling occurs in the set of Internet pages, the more likely it is that the alternative spelling would produce search results in accord with the interests of the user who requested the search.

The search engine may also, or instead, determine how frequently each alternative spelling occurs in one or more previously received requests to search the set of Internet pages. In making this determination, the search engine may consult a log of search requests that the search engine has previously received. The log may include each spelling of each previously entered search query. Some spellings may occur more frequently in the log than other spellings. Alternatively, the search engine may consult an index that indicates, for each spelling that occurs in the log, how frequently that spelling occurs in the log. The more frequently an alternative spelling occurs in the log, the more likely it is that the alternative spelling would produce search results in accord with the interests of the user who requested the search.

While in one embodiment, both of the factors described above are used to select an alternative spelling, in alternative embodiments, only one or the other of these factors is used to select an alternative spelling.

Before consulting a full index of spellings to determine the frequency of an occurrence of a spelling in a plurality of files or previously received search requests, a search engine may consult a cache. The cache may contain a subset of spellings (with associated frequencies) from the full index that are most often searched for, or most recently searched for, in the full index. If a spelling is not contained in the cache, then the search engine may consult the full index.

In block 106, the alternative spelling is optionally presented to a user. For example, the search engine may present, to the user who entered the search request, a page that asks the user if he meant to enter the alternative spelling instead of the spelling that he entered. The search engine may additionally accept input from the user that indicates whether the user prefers to use the alternative spelling instead of the spelling that the user entered.

While in one embodiment, the alternative spelling is presented to a user, in an alternative embodiment, the alternative spelling is automatically, without any input from the user, substituted for the spelling that the user originally entered in the search query. Thus, in various embodiments, a user may or may not be permitted to choose whether the alternative spelling will be substituted for the originally entered spelling in the search query.

While in one embodiment, the alternative spelling is presented to the user before the search engine performs a search for the originally entered spelling, in an alternative embodiment, the alternative spelling is presented to the user after the search engine performs a search for the originally entered spelling.

While in one embodiment, only one alternative spelling is presented to the user, in an alternative embodiment, more than one spelling may be presented to the user. While in one embodiment, an alternative spelling is always presented to the user, in an alternative embodiment, an alternative spelling is only presented to the user under specified circumstances.

Thus, a search engine may aid a user in obtaining search results that are of the most interest to the user by suggesting alternative spellings that are gleaned from various sources and evaluated according to various criteria. With each search request, the sources from which alternative spellings are gleaned may grow and become more refined. Viewed from one perspective, the search engine is capable of learning. Consequently, the search engine may more intelligently select an alternative spelling to suggest to a user.

Selecting the Alternative Spelling Based on how Frequently the Alternative Spelling Occurs in the Plurality of Files A candidate alternative spelling may be evaluated for selection based on the frequency of that candidate alternative spelling relative to the frequency of a particular spelling for which the candidate alternative spelling is an alternative. This helps to avoid the suggestion of an alternative spelling that, when used instead of another spelling in a search request, would actually cause less interesting results to be provided to a user than if the other spelling had been used.

Figure 2:
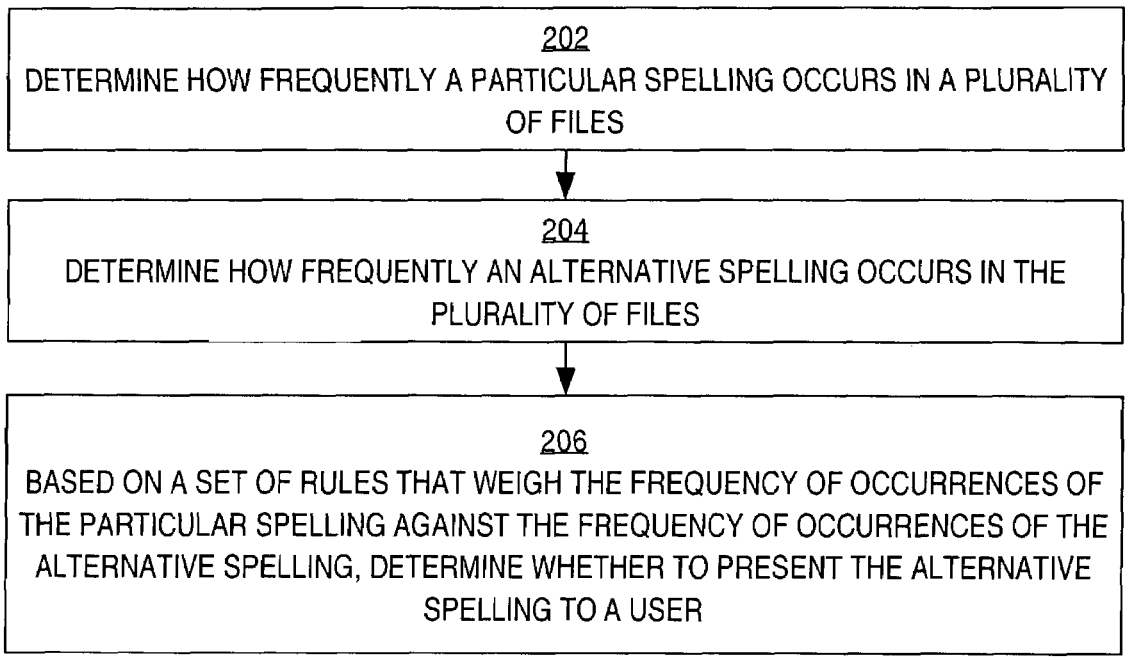
FIG. 2 is a flow diagram that illustrates a technique, according to an embodiment of the present invention, for selecting an alternative spelling based on the frequencies of occurrences of two different spellings in a plurality of files.

FIG. 2 is a flow diagram that illustrates a technique, according to an embodiment of the present invention, for selecting an alternative spelling based on the frequencies of occurrences of two different spellings in a plurality of files. In block 202, it is determined how frequently a particular spelling occurs in a plurality of files. For example, a search engine may consult a pre-generated index, such as is discussed above, to determine how frequently a particular spelling, which was entered as part of a search request, occurs in a set of pages.

In block 204, it is determined how frequently an alternative spelling occurs in the plurality of files. For example, a search engine may consult a pre-generated index to determine how frequently an alternative spelling occurs in a set of pages. The alternative spelling may be a spelling that was suggested by a spelling checking routine as being a possible alternative spelling of the particular spelling that was entered in the search request.

In block 206, based on a set of one or more rules that weigh the frequency of occurrences of the particular spelling against the frequency of occurrences of the alternative spelling, it is determined whether to present the alternative spelling to a user. For example, a search engine may apply a rule that states that the alternative spelling should not be presented to a user if the frequency of occurrences of the particular spelling is greater than the frequency of occurrences of the alternative spelling.

A search engine administrator may construct such a rule and store the rule in a set of rules that the search engine applies when evaluating candidate alternative spellings for presentation to a user. Rules may take the form of conditional statements. The variety of different rules that could be constructed is practically limitless.

Figure 3:
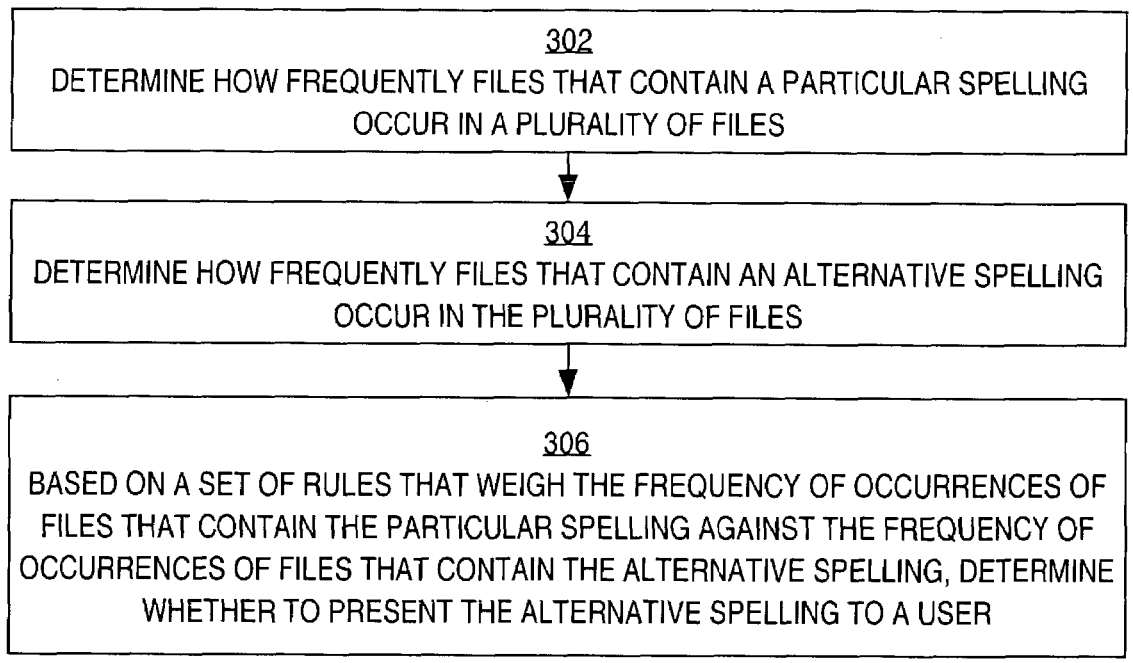
FIG. 3 is a flow diagram that illustrates a technique, according to an embodiment of the present invention, for selecting an alternative spelling based on the frequencies of occurrences of files, in a plurality of files, that contain one of two different spellings.

FIG. 3 is a flow diagram that illustrates a technique, according to an embodiment of the present invention, for selecting an alternative spelling based on the frequencies of occurrences of files, in a plurality of files, that contain one of two different spellings. While the technique described above with reference to FIG. 2 evaluates an alternative spelling based on a total spelling frequency, the technique described below evaluates an alternative spelling based on a frequency of occurrences of files that contain one or more instances of the alternative spelling. The technique described below may be used to give less weight to alternative spellings that occur many times in each of only a relatively few pages, and more weight to alternative spellings that occur only a relatively few times in each of many pages.

In block 302, it is determined how frequently files that contain a particular spelling occur in a plurality of files. For example, a search engine may consult a pre-generated index to determine how frequently pages that include a particular spelling, which was entered as part of a search request, occur in a set of pages.

In block 304, it is determined how frequently files that contain an alternative spelling occur in the plurality of files. For example, a search engine may consult a pre-generated index to determine how frequently pages that include an alternative spelling occur in a set of pages.

In block 306, based on a set of one or more rules that weigh the frequency of occurrences of files that contain the particular spelling against the frequency of occurrences of files that contain the alternative spelling, it is determined whether to present the alternative spelling to a user. For example, a search engine may apply a rule that states that the alternative spelling should not be presented to a user if the frequency of occurrences of files that contain the particular spelling is greater than the frequency of occurrences of files that contain the alternative spelling.

While in one embodiment, the determination whether to present an alternative spelling is based on a frequency of occurrences of that alternative spelling in a plurality of files, in an alternative embodiment, that determination is based on a relevance score of one or more pages that contain the alternative spelling. Relevance scores may be determined by a variety of techniques. For example, a page's relevance score may be based on how many words, from the search request, are contained in the page, and/or how frequently those words occur in the page. A page's relevance score may also take into account some "page quality metrics" like a citation index, the authoritativeness of the page source, etc. A page's relevance may also be defined relative to the user who submitted the query. For example, relevance may be based on the language used to submit the query (e.g., English or French). For another example, relevance may be based on properties of the user (e.g., the user's geographic region, gender, or social group). Thus, relevance scores for pages that result from query submitted by a user in the United Kingdom may be determined differently than relevance scores for pages that result from the same query submitted by a user in the United States. A search engine may compare the relevance scores of one or more pages that would result from a search request that contains the particular spelling with relevance scores of one or more pages that would result from a search request that contains the alternative spelling instead of the particular spelling.

Selecting the Alternative Spelling Based on how Frequently the Alternative Spelling Occurs in the Previously Received Search Requests A search engine may receive thousands of search requests. The search engine may maintain a log of the spellings used in these search requests. Some identical or nearly identical search requests may be submitted to a search engine multiple times. The frequency with which a given spelling is contained in prior search requests may be a strong indicator of how likely that spelling was meant to be used instead of a different spelling.

Figure 4:
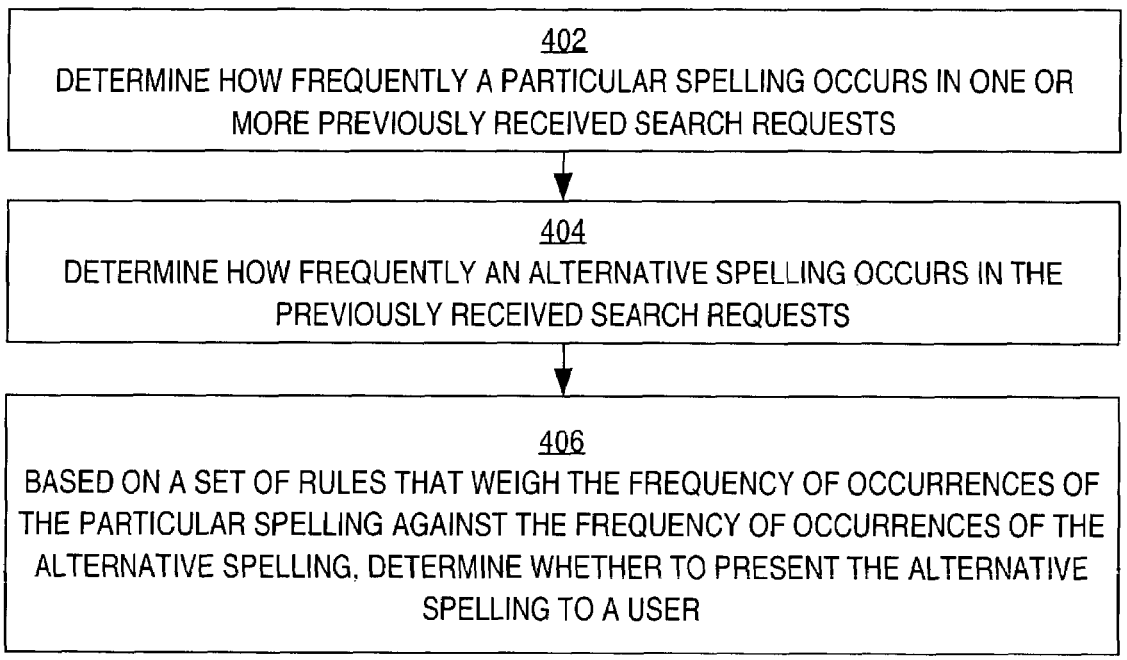
FIG. 4 is a flow diagram that illustrates a technique, according to an embodiment of the present invention, for selecting an alternative spelling based on the frequencies of occurrences of two different spellings in one or more previously received search requests.

FIG. 4 is a flow diagram that illustrates a technique, according to an embodiment of the present invention, for selecting an alternative spelling based on the frequencies of occurrences of two different spellings in one or more previously received search requests. In block 402, it is determined how frequently a particular spelling occurs in one or more previously received search requests. For example, a search engine may consult a pre-generated index to determine how frequently a particular spelling, which was entered as part of the search request, occurs in a set of search requests that the search engine received previously to the search request. Such an index may be adjusted after each new search request.

In block 404, it is determined how frequently an alternative spelling occurs in the previously received search requests. For example, a search engine may consult a pre-generated index to determine how frequently an alternative spelling occurs in the previously received search requests.

In block 406, based on a set of one or more rules that weigh the frequency of occurrences of the particular spelling against the frequency of occurrences of the alternative spelling, it is determined whether to present the alternative spelling to a user. For example, a search engine may apply a rule that states that the alternative spelling should not be presented to a user if the frequency of occurrences of the particular spelling is greater than the frequency of occurrences of the alternative spelling.

In some embodiments, the determination whether to present the alternative spelling to a user is based on how the alternative spelling compares to other alternative spellings, and not merely based on how the alternative spelling compares to the original spelling.

Context-Sensitive Alternative Spelling Selection

When a user enters more than one word into a search request, one or more of those words may be used in the wrong context relative to the other words. For example, a user who wants to search for information relating to "Silicon Valley" may mistakenly submit a search request for "Silicone Valley." The frequency with which a given spelling occurs in the same file, or in the same previously received search request, as another word may be a good indicator of whether the given spelling was used in a correct context in the search request that includes that other word. For example, one would expect that a search engine would encounter more files and search requests that contain both the words "Silicon" and "Valley" than files and search requests that contain both the words "Silicone" and "Valley." Thus, a search engine may confidently suggest to a user who entered "Silicone Valley" that the user might have wished to enter the alternative "Silicon Valley" instead.

Figure 5:
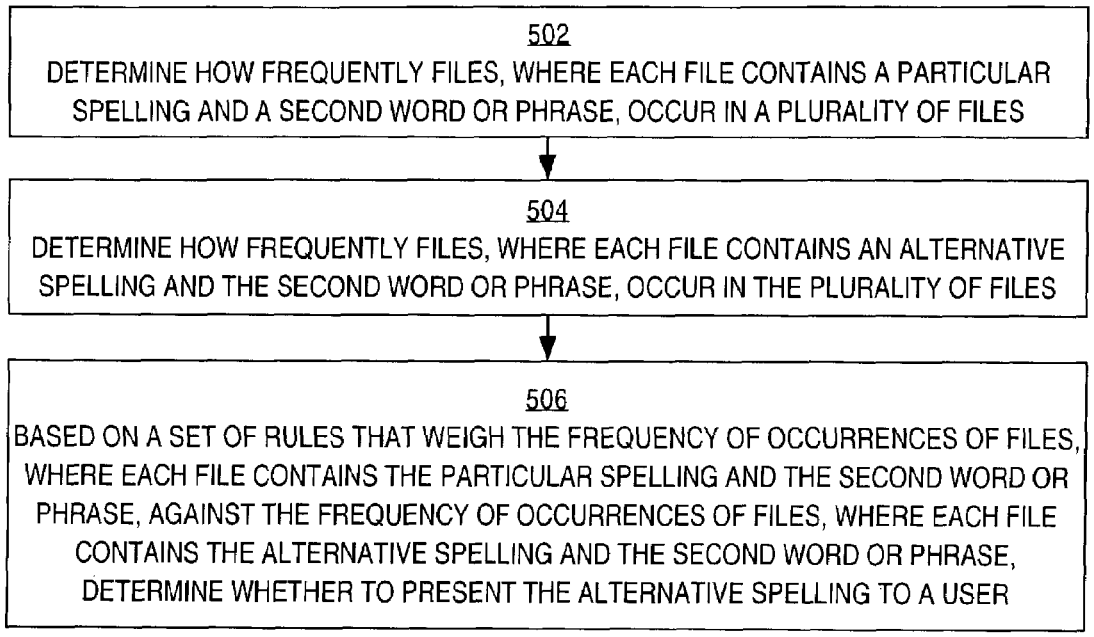
FIG. 5 is a flow diagram that illustrates a technique, according to an embodiment of the present invention, for selecting an alternative spelling based on the frequencies of occurrences of files, in a plurality of files, which contain at least two of at least three different words or phrases.

FIG. 5 is a flow diagram that illustrates a technique, according to an embodiment of the present invention, for selecting an alternative spelling based on the frequencies of occurrences of files, in a plurality of files, which contain at least two of at least three different words or phrases. In block 502, it is determined how frequently files, in which each file contains a particular spelling and a second word or phrase, occur in a plurality of files. For example, a search engine may determine how frequently pages, which contain both "Silicone" and "Valley", occur in a set of pages.

While in one embodiment, the second word or phrase is a word or phrase that was entered in a search request with the particular spelling, in an alternative embodiment, the second word or phrase may be obtained from a statistical repository that contains information on the frequencies with which certain words or phrases appear in the same pages as other words or phrases.

In block 504, it is determined how frequently files, in which each file contains an alternative spelling and the second word or phrase, occur in the plurality of files. For example, a search engine may determine how frequently pages, which contain both "Silicon" and "Valley", occur in a set of pages.

In block 506, based on a set of rules that weigh the frequency of occurrences of files, in which each file contains both the particular spelling and the second word or phrase, against the frequency of occurrences of files, in which each file contains the alternative spelling and the second word or phrase, it is determined whether to present the alternative spelling to a user. For example, a search engine may apply a rule that states that the alternative spelling should not be presented to a user if the frequency of occurrences of pages that contain both the particular spelling and the second word or phrase is greater than the frequency of occurrences of pages that contain both the alternative spelling and the second word or phrase. In other words, the rule may cause a search engine to not present an alternative spelling "Silicon" if "Silicone" occurs in pages with "Valley" more frequently than "Silicon" occurs in pages with "Valley".

While in one embodiment, the determinations described above determine the frequencies with which a particular spelling or alternative spelling occurs in the same files as a second word or phrase, in an alternative embodiment, the determinations determine the frequencies with which a particular spelling or alternative spelling occurs within some proximity of (e.g., immediately next to, within some distance of words as, in the same sentence as, in the same paragraph as, etc.) the second word or phrase.

While in one embodiment, a frequency of pages that include both the second word or phrase and either the particular spelling or alternative spelling is determined, in an alternative embodiment, a frequency of pages that include both a set of words or phrases and either the particular spelling or the alternative spelling is determined.

Figure 6:
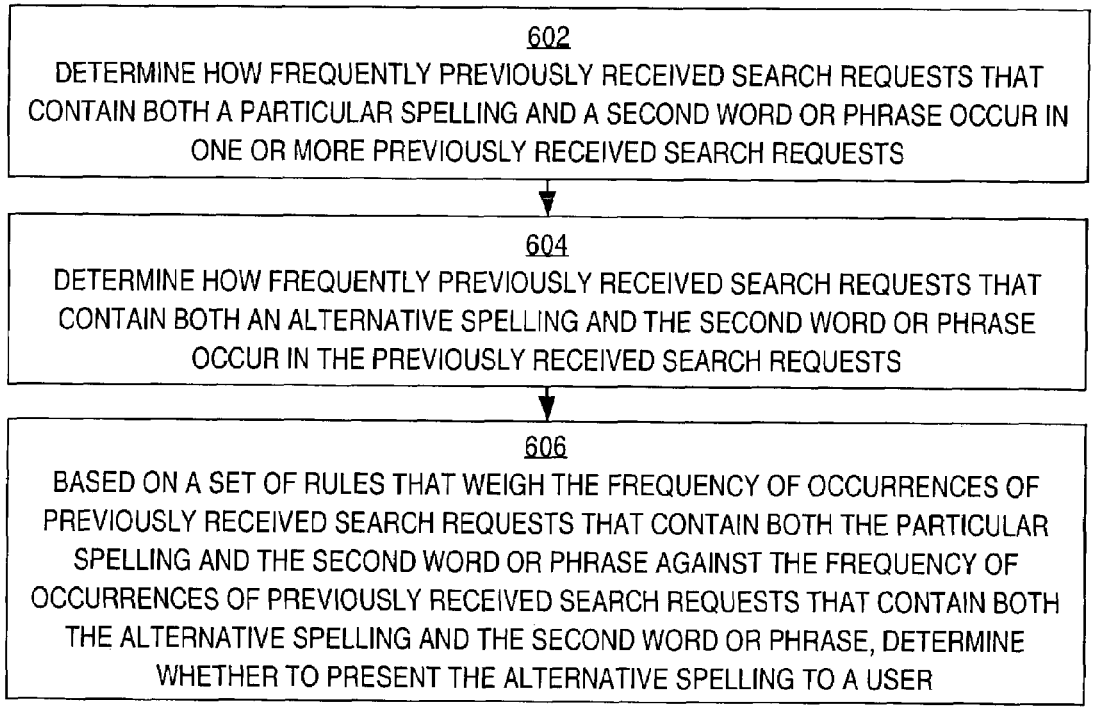
FIG. 6 is a flow diagram that illustrates a technique, according to an embodiment of the present invention, for selecting an alternative spelling based on the frequencies of occurrences of previously received search requests that contain at least two of at least three different words or phrases.

FIG. 6 is a flow diagram that illustrates a technique, according to an embodiment of the present invention, for selecting an alternative word based on the frequencies of occurrences of previously received search requests which contain at least two of at least three different words or phrases. In block 602, it is determined how frequently previously received search requests that contain both a particular spelling and a second word or phrase occur in one or more previously received search requests. For example, a search engine may determine how frequently previously received search requests, which contain both "Silicone" and "Valley", occur in a set of previously received search requests.

While in one embodiment, the second word or phrase is a word or phrase that was entered in a search request with the particular spelling, in an alternative embodiment, the second word or phrase may be obtained from a statistical repository that contains information on the frequencies with which certain words or phrases appear in the same previously received search requests as other words or phrases.

In block 604, it is determined how frequently previously received search requests that contain both an alternative spelling and the second word or phrase occur in the previously received search requests. For example, a search engine may determine how frequently previously received search requests, which contain both "Silicon" and "Valley", occur in a set of previously received search requests.

In block 606, based on a set of rules that weigh the frequency of occurrences of previously received search requests that contain both the particular spelling and the second word or phrase against the frequency of occurrences of previously received search requests that contain both the alternative spelling and the second word or phrase, it is determined whether to present the alternative spelling to a user. For example, a search engine may apply a rule that states that the alternative spelling should not be presented to a user if the frequency of occurrences of previously received search requests that contain both the particular spelling and the second word or phrase is greater than the frequency of occurrences of previously received search requests that contain both the alternative spelling and the second word or phrase. In other words, the rule may cause a search engine to not present an alternative spelling "Silicon" if "Silicone" occurs in previously received search requests with "Valley" more frequently than "Silicon" occurs in previously received search requests with "Valley".

Selecting the Alternative Spelling Based on how Frequently the Alternative Spelling was Accepted As described above, an alternative spelling may be presented to a user as an alternative to a spelling that the user entered in a search request. The user may have the option of accepting or rejecting a suggested alternative spelling. When the user either accepts or rejects an alternative spelling, that acceptance or rejection may be recorded for future use. A record may be made of the acceptance or rejection of the alternative spelling relative to the particular spelling to which the alternative spelling was suggested as an alternative, and/or relative to one or more of the other words or phrases that were entered in the search request. The frequency with which an alternative spelling is accepted or rejected may be a good indicator of whether the alternative spelling should be suggested under similar circumstances in the future.

Figure 7:
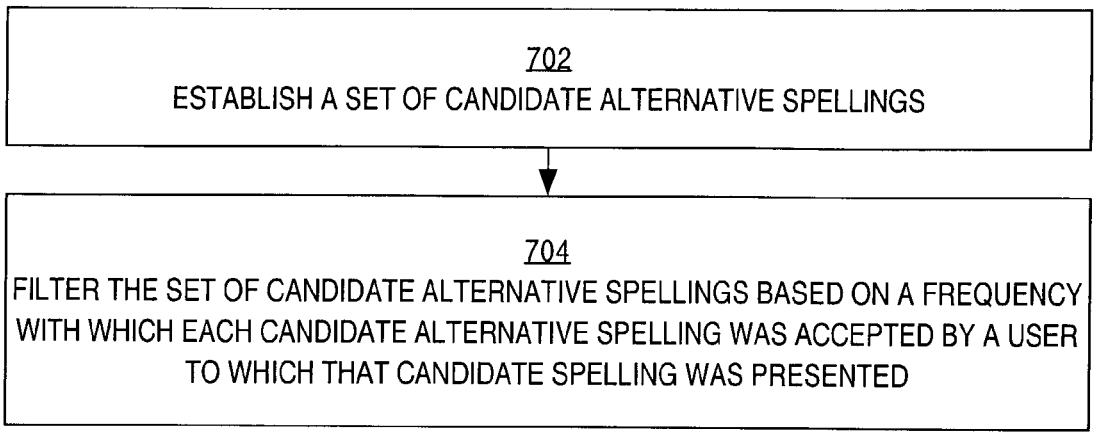
FIG. 7 is a flow diagram that illustrates a technique, according to an embodiment of the present invention, for filtering a set of candidate alternative spellings based on the frequencies with which those candidate alternative spellings were accepted in the past.

FIG. 7 is a flow diagram that illustrates a technique, according to an embodiment of the present invention, for filtering a set of candidate alternative spellings based on the frequencies with which those candidate alternative spellings were accepted in the past. In block 702, a set of candidate alternative spellings is established. For example, the set of candidate alternative spellings may include spellings that were selected by a spelling checking routine and/or a routine that selects synonyms of received spellings. The set of candidate alternative spellings may include spellings that were determined, based on a set of rules and other determinations such as those described above, to be alternative spellings that could be presented to a user.

In block 704, the set of candidate spellings is filtered based on a frequency with which each candidate spelling was accepted. For example, a search engine may remove, from a list of candidate alternative spellings, any candidate alternative spellings that are associated with an accept/reject ratio that is less than a specified threshold (e.g., 50%). While in one embodiment, candidate spellings are filtered based on acceptance rate even if those candidate spellings have never presented to a user, in an alternative embodiment, only those candidate spellings that have actually been accepted or rejected by a user are filtered based on acceptance rate.

An acceptance rate associated with a candidate alternative spelling may be a total acceptance rate of the candidate alternative spelling, an acceptance rate of the candidate alternative spelling relative to a particular word or phrase, or an acceptance rate of the candidate alternative spelling relative to a particular set of words or phrases.

In one embodiment, after the set of candidate alternative spellings has been filtered, the spellings remaining in the set of candidate alternative spellings may be presented to a user as suggested alternatives to a particular spelling that the user entered in a search request.

Selecting the Alternative Spelling Based on Rules

As described above, one or more rules may be specified by which candidate alternative spellings may be evaluated in determining whether those candidate alternative spellings should be suggested to a user. Such rules may include specified thresholds. If a threshold that is associated with a rule is met or exceeded by a particular number (e.g., score, frequency, etc.) that is associated with a candidate alternative spelling, then the candidate alternative spelling satisfies the rule. If a number that is associated with a candidate alternative spelling does not meet a threshold that is associated with a rule, then the candidate alternative spelling does not satisfy the rule.

In one embodiment, different weights may be associated with different sources from which candidate alternative spellings are gleaned. For example, a rule may indicate that, at least under specified circumstances, the frequency of occurrence in previously received search requests should be a greater factor in determining whether to present an alternative spelling to a user than the frequency of occurrence in a plurality of files.

While in one embodiment, candidate alternative spellings that do not satisfy one or more specified rules are not presented to a user, in an alternative embodiment, a candidate alternative spelling may be presented to a user even if that candidate alternative spelling does not satisfy one or more specified rules. For example, according to one embodiment, in one out of every N alternative spelling suggestions, a suggestion may include an alternative spelling that does not satisfy one or more specified rules. The frequency with which a suggestion may include an alternative spelling that does not satisfy one or more rules may itself be specified. An alternative spelling that is suggested in spite of not satisfying one or more rules may be selected based on how close the alternative spelling came to satisfying one or more rules (i.e., how close a number associated with the alternative spelling was to one or more thresholds specified by one or more rules).

Thus, in one embodiment, a user may potentially accept a candidate alternative spelling even if that candidate alternative spelling did not satisfy some specified rule, especially if the candidate alternative spelling came very close to satisfying the specified rule. The acceptance of a candidate alternative spelling that did not satisfy some rule may be an indicator that the unsatisfied rule should be modified.

Extending the Set of Possible Alternative Spellings

As described above, a candidate alternative spelling may initially be selected from some repository of spellings, such as a dictionary file or a thesaurus file. Such a repository may be viewed as a set of possible alternative spellings. Once a candidate alternative spelling is selected from the repository (e.g., due to that alternative spelling being spelled similarly to, but not exactly the same as, a particular spelling that a user entered into a search request), that candidate alternative spelling may be further evaluated in a determination whether to ultimately present that candidate alternative spelling to a user.

In one embodiment, the set of possible alternative spellings (i.e., the spelling repository, dictionary, thesaurus, etc.) may be extended to include spellings that were not originally contained in the set. For example, a proper noun, such as a person's name, which is unlikely to be contained in a standard dictionary, but may be contained in several pages, may be added to a dictionary file upon the satisfaction of some criteria.

Spellings that are included in links to files, such as the spellings that are contained in the label of a hypertext link to a page, may be more likely to be spelled correctly and used in a proper context than spellings that are not contained in links. Spellings contained in links may be referred to as "anchor text". These spellings may be especially suitable for addition in the set of possible alternative spellings.

Figure 8:
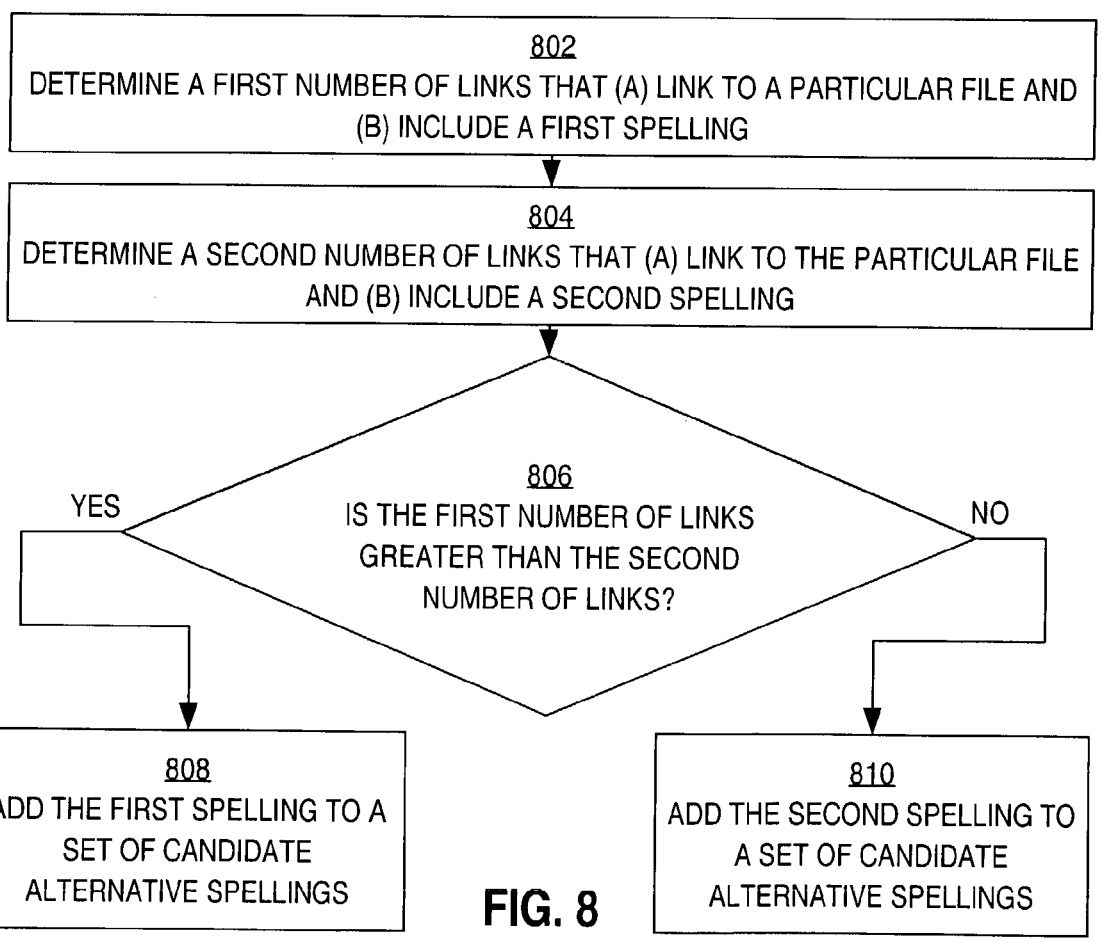
FIG. 8 is a flow diagram that illustrates a technique, according to an embodiment of the present invention, for determining, based on links to a file, whether a spelling should be added to a set of possible alternative spellings.

FIG. 8 is a flow diagram that illustrates a technique, according to an embodiment of the present invention, for determining, based on links to a file, whether a spelling should be added to a set of possible alternative spellings. The technique is especially applicable for determining which version of a spelling should be added to a dictionary when two similar but unequal spellings are used in different links to a same page.

In block 802, a first number of links, which (a) link to a particular file and (b) include a first spelling, is determined. For example, to determine such a number, a search engine may consult a pre-generated index that contains, for each page and each spelling that appears in a link to that page, a number of times that a spelling occurs.

In block 804, a second number of links, which (a) also link to the particular file and (b) include a second spelling, is determined. The second spelling may be, for example, a spelling that is similar to, but not exactly the same as, the first spelling.

In block 806, it is determined whether the first number of links is greater than the second number of links. If the first number of links is greater than the second number of links, then, in block 808, the first spelling is added to a set of candidate alternative spellings. If the second number of links is greater than the first number of links, then, in block 810, the second spelling is added to the set of candidate alternative spellings. The set of candidate alternative spellings may be a dictionary file that is consulted by a spelling checking routine.

For example, a search engine could receive a search request for "Abraham Lincon". The search engine might not find either the spelling "Lincoln" or the spelling "Lincon" in a dictionary file. The search engine may determine that the spelling "Lincoln" occurs in ten links that link to a particular page, and that the spelling "Lincon" occurs in only one link to the same particular page. Based on this determination, the search engine may confidently add the spelling "Lincoln" to the dictionary file and omit the spelling "Lincon" from the dictionary file. It is likely, given the evidence provided in the anchor text, that the spelling "Lincon" is a misspelling that should not be added to the dictionary file.

In one embodiment, the file to which the links refer is also inspected to determine if the first spelling or the second spelling is contained in the file itself. In one embodiment, the frequency with which a spelling occurs in a file itself is given more weight than the frequency with which a spelling occurs in a link to that file. Therefore, even if the spelling "Lincon" occurs in more links to a page than the spelling "Lincoln", the search engine would add the spelling "Lincoln", and not the spelling "Lincon", to the dictionary file if the spelling "Lincoln" occurred more frequently than the spelling "Lincon" within the page itself.

Generating and Filtering Candidate Alternative Spellings Based on how Frequently Spellings Occur in Result Fields Result fields are fields that are typically displayed for each search result in a list of displayed search results. Search results typically include, for each result, a title of a page, one or more abstracts of a page, and a Uniform Resource Locator (URL) of a page. In one embodiment, candidate alternative spellings are generated based on how frequently certain spellings occur in result fields. In one embodiment, a set of candidate alternative spellings is filtered based on how frequently those candidate alternative spellings occur in result fields.

By looking for matches in the text of results fields, the asymmetry between anchor text and page content may be leveraged in order to generate and filter candidate alternative spellings. Anchor text may contain more misspellings than text that is contained in a title of a page, an abstract of a page, or a URL.

In one embodiment, to generate alternative candidate spellings, a page is searched for two spellings that are similar to, but not exactly the same as, each other. Then, for each spelling, a search is performed for files, in a plurality of files, which contain that spelling. Thus, for each spelling, a list of search results is obtained. Each result typically includes one or more result fields.

Then, for each of the two sets of results (one for each spelling), one or more of the result fields for each result is searched for the other one of the two spellings (i.e., the spelling that was not used to generate the results). A frequency of each spelling in the result fields generated by a search for the other spelling is obtained. That is, a frequency of a first spelling in the result fields generated by a search for a second spelling is obtained, and a frequency of the second spelling in the result fields of the first spelling is obtained. Based on a comparison between the two frequencies, one spelling may be selected over the other for inclusion in a list of candidate alternative spellings. In one embodiment, only a specified number of results are searched (e.g., the top ten results, ranked by relevance, for each spelling).

In one embodiment, searches for sets of multiple spellings may be performed, and one set of multiple spellings may be selected over another based on a comparison between a frequency of occurrences of a first set in the results of a search for the second set and a frequency of occurrences of the second set in the results of a search for the first set.

Figure 9B:
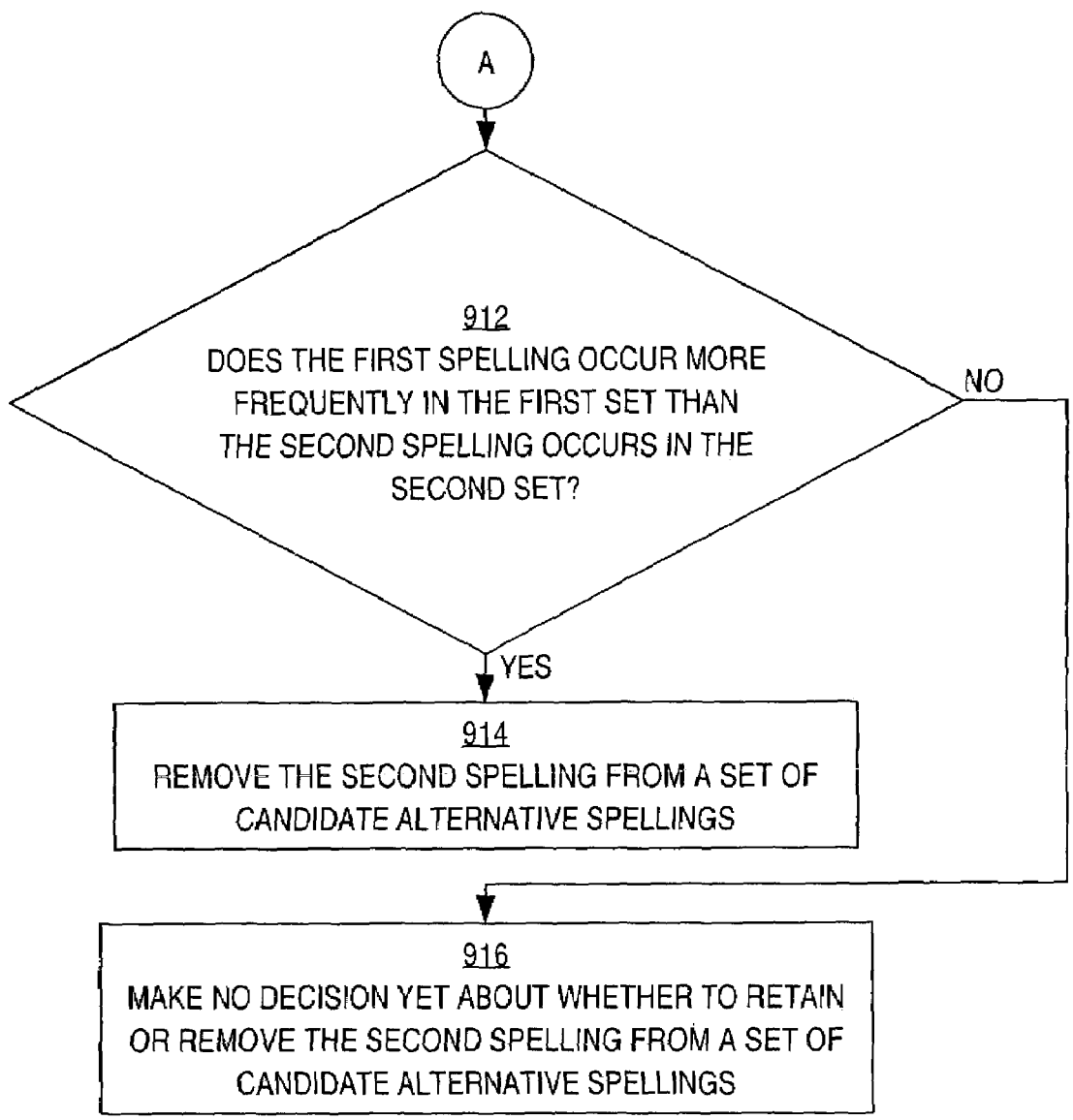

FIGS. 9A and 9B are flow diagrams that illustrate a technique, according to an embodiment of the present invention, for determining whether to retain or remove a candidate alternative spelling from a set of candidate alternative spellings based on how frequently the candidate alternative spelling occurs in result fields obtained from a search for another spelling. Through the technique illustrated below, a set of candidate alternative spellings may be filtered.

Referring to FIG. 9A, in block 902, a search is performed for occurrences of a first spelling in a plurality of files. The first spelling may be, for example, a spelling that a user originally submitted in a search request. Results of the search for the first spelling are obtained as a first set of result fields.

In block 904, a search is performed for occurrences of a second spelling in the plurality of files. The second spelling may be, for example, a spelling that is similar to, but not exactly the same as, the first spelling. The second spelling may be a spelling that is returned by a spelling checking routine when the first spelling is submitted to the routine. The second spelling may be a spelling that occurs in anchor text of a page on which anchor text also contains the first spelling. Results of the search for the second spelling are obtained as a second set of result fields.

In block 906, it is determined whether a frequency of occurrences of the second spelling in the first set of result fields is greater than a frequency of occurrences of the first spelling in the second set of result fields. If the frequency of occurrences of the second spelling in the first set of result fields is greater than the frequency of occurrences of the first spelling in the second set of result fields, then control passes to block 908. Otherwise, control passes to block 910.

In block 908, the second spelling is retained in a set of candidate alternative spellings. The second spelling may ultimately be presented to a user as a suggested alternative spelling to the first spelling.

In block 910, it is determined whether a frequency of occurrences of the second spelling in the second set of result fields is greater than a frequency of occurrences of the first spelling in the first set of result fields. If the frequency of occurrences of the second spelling in the second set of result fields is greater than the frequency of occurrences of the first spelling in the first set of result fields, then control passes to block 908. Otherwise, control passes to block 912, which is illustrated in FIG. 9B.

Referring to FIG. 9B, in block 912, it is determined whether a frequency of occurrences of the first spelling in the first set of result fields is greater than a frequency of occurrences of the second spelling in the second set of result fields. If the frequency of occurrences of the first spelling in the first set of result fields is greater than the frequency of occurrences of the second spelling in the second set of result fields, then control passes to block 914. Otherwise, control passes to block 916.

In block 914, the second spelling is removed from a set of candidate alternative spellings. The second spelling will not be presented to a user as a suggested alternative spelling to the first spelling.

In block 916, it is not decided whether to retain or remove the second spelling from a set of candidate alternative spellings. That decision may be made, instead, based on some other criteria.

In one embodiment, if the difference between the average relevance score of the first set and the average relevance score of the second set is less than a specified number, then the second spelling is removed from a set of candidate alternative spellings.

In one embodiment, if a ratio of the frequency of the first spelling in the second set to the frequency of the second spelling in the first set is less than a specified number, then the second spelling is removed from a set of candidate alternative spellings.

In one embodiment, if the difference between the frequency of the second spelling in the second set and the frequency of the first spelling in the first set is greater than or equal to a specified number, then the second spelling is retained in a set of candidate alternative spellings.

In one embodiment, the second spelling is not retained in a set of candidate alternative spellings unless one or more specified conditions are satisfied.

Hardware Overview

Figure 10:
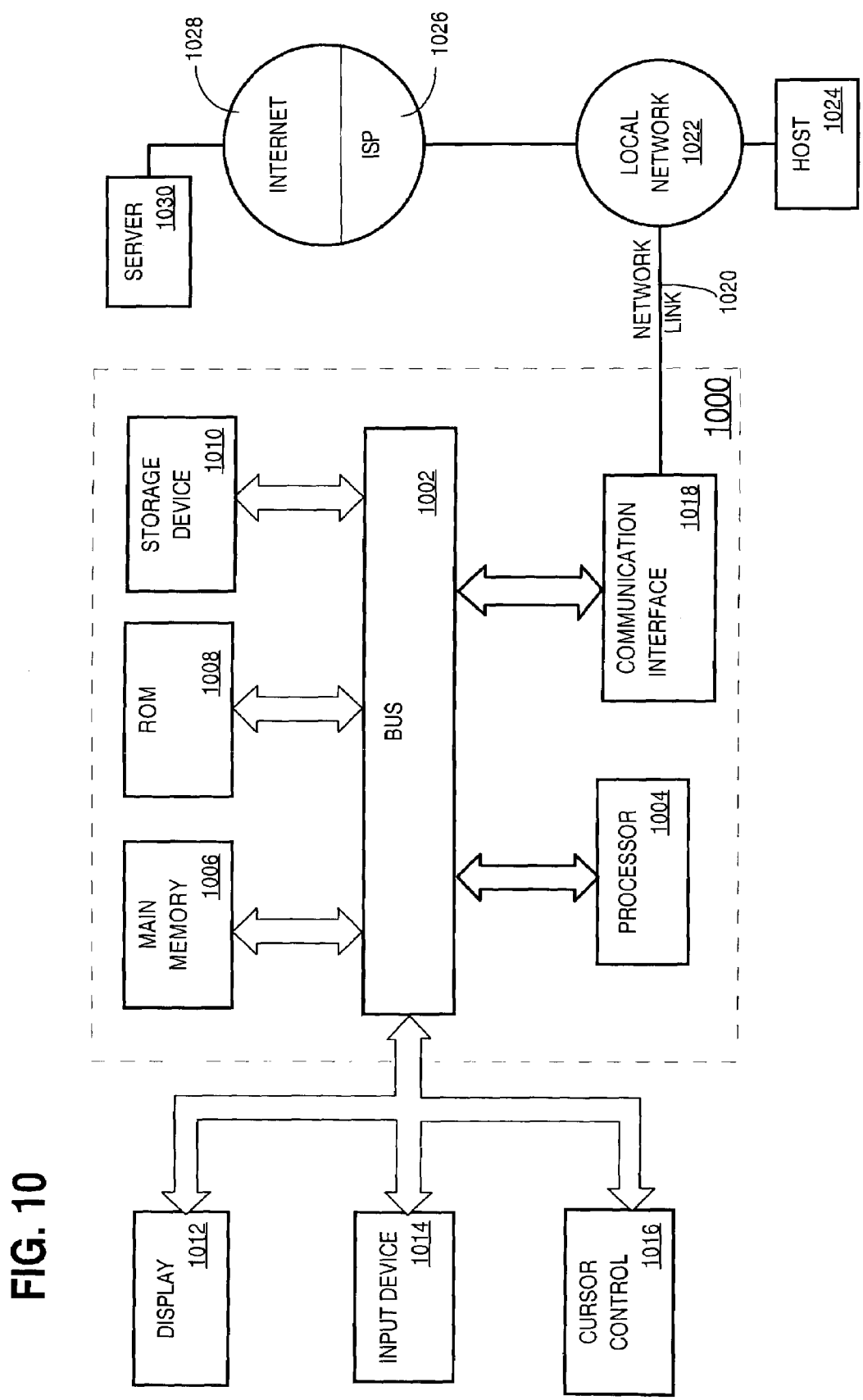
FIG. 10 is a block diagram that illustrates a computer system 1000 upon which an embodiment of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions, wherein the machine-executed operation is at least one of:

A) sending the instructions over transmission media;
   B) receiving the instructions over transmission media;
   C) storing the instructions onto a machine-readable storage medium; and
   D) executing the instructions;

wherein the instructions, when executed by one or more processors, cause the one or more processors to perform the steps of:

receiving, from a user, a request to search a plurality of files for files that match a query that includes a word, wherein said word is spelled, in said query, according to a particular spelling;

determining, for each file in said plurality of files, (a) a first number of times that an alternative spelling of said word occurs in that file, and (b) a second number of times that said particular spelling of said word occurs in that file, and adding said first number, weighted with a first weight, to a first total count that is associated with said with said alternative spelling of said word, and adding said second number, weighted with a second weight, to a second total count that is associated with said particular spelling of said word;

selecting the alternative spelling of said word based on a set of factors, wherein said set of factors includes whether the first total count exceeds the second total count; and suggesting said alternative spelling of said word to said user; wherein selecting said alternative spelling includes: (a) establishing a set of candidate spellings, (b) filtering said set of candidate spellings based on how frequently each candidate spelling in said set of candidate spellings was previously selected as an alternative to said query, and (c) selecting said alternative spelling from the filtered set of candidate spellings.

2. The method of claim 1, wherein one or more candidate spellings in said set of candidate spellings was presented to a user as an alternative to said query.

3. A method comprising performing a machine-executed operation involving instructions, wherein the machine-executed operation is at least one of:

A) sending the instructions over transmission media;
   B) receiving the instructions over transmission media;
   C) storing the instructions onto a machine-readable storage medium; and
   D) executing the instructions;

wherein the instructions, when executed by one or more processors, cause the one or more processors to perform the steps of:

receiving, from a user, a request to search a plurality of files for files that match a query that includes a word, wherein said word is spelled, in said query, according to a particular spelling;

determining, for each file in said plurality of files, (a) a first number of times that an alternative spelling of said word occurs in that file, and (b) a second number of times that said particular spelling of said word occurs in that file, and adding said first number to a first total count that is associated with said alternative spelling of said word, and adding said second number to a second total count that is associated with said particular spelling of said word;

selecting the alternative spelling of said word from a set of candidate spellings based on a set of factors, wherein said set of factors includes whether the first total count exceeds the second total count; and suggesting said alternative spelling of said word to said user;

wherein selecting said alternative spelling includes: (a) determining a first number of links that each: (1) link to a particular file, and (2) contain a first spelling; (b) determining a second number of links that each: (1) link to said particular file, and (2) contain a second spelling; (c) adding the first spelling to the set of candidate alternative spellings if said first number is greater than said second number; and (d) adding the second spelling to the set of candidate alternative spellings if said second number is greater than said first number;

wherein the alternative spelling is either the first spelling or the second spelling.

4. The method of claim 3, wherein said second spelling is spelled similarly to, but not exactly the same as, said first spelling.

5. The method of claim 3, wherein the steps further comprise:

presenting said alternative spelling to a user if one or more specified rules is satisfied.

6. The method of claim 3, wherein said alternative spelling consists of a different number of separate words than said query.

7. The method of claim 3, wherein the steps further comprise:

submitting said word to spelling-checking means;

wherein said spelling-checking means generates, based on said word, a set of one or more candidate alternative spellings of said word;

wherein the step of selecting said alternative spelling of said word comprises selecting said alternative spelling from said set of one or more candidate alternative spellings of said word.

8. The method of claim 3, wherein the step of selecting said alternative spelling of said word comprises:

generating, based on said word, a plurality of candidate alternative words; and selecting, as said alternative spelling of said word, a particular candidate alternative word from said plurality of candidate alternative words;

wherein each candidate alternative word in said plurality of candidate alternative words differs from each other candidate alternative word in said plurality of candidate alternative words.

9. A method comprising performing a machine-executed operation involving instructions, wherein the machine-executed operation is at least one of:

A) sending the instructions over transmission media;
B) receiving the instructions over transmission media;
C) storing the instructions onto a machine-readable storage medium; and
D) executing the instructions;

wherein the instructions, when executed by one or more processors, cause the one or more processors to perform the steps of:

receiving, from a user, a request to search a plurality of files for files that match a query that includes a particular spelling of a word;

selecting an alternative spelling of said word based on a set of factors, wherein said set of factors includes whether (a) a frequency, with which said alternative spelling occurs in one or more results of a search for said particular spelling of said query but not for said alternative spelling, is greater than (b) a frequency, with which said particular spelling of said query occur in one or more results of a search for said alternative spelling;

wherein said set of factors includes whether (a) a frequency, with which said alternative spelling occurs in one or more results of a search for said alternative spelling is greater than (b) a frequency, with which said particular spelling occurs in one or more results of a search for said particular spelling of said query; and suggesting said alternative spelling of said word to said user.

10. The method of claim 9, wherein said one or more results include one or more titles of pages.

11. The method of claim 9, wherein said one or more results include one or more abstracts of pages.

12. The method of claim 9, wherein said one or more results include one or more Uniform Resource Locators (URLs) of pages.

13. The method of claim 9, wherein said set of factors includes whether a frequency with which said alternative spelling occurs in one or more results of a search for said alternative spelling is greater than a frequency with which one or more words of said query occur in one or more results of a search for said query.

14. A method comprising performing a machine-executed operation involving instructions, wherein the machine-executed operation is at least one of:

A) sending the instructions over transmission media;
B) receiving the instructions over transmission media;
C) storing the instructions onto a machine-readable storage medium; and
D) executing the instructions;

wherein the instructions, when executed by one or more processors, cause the one or more processors to perform the steps of:

finding, in first anchor text that is contained in a page, a first spelling that is spelled similarly to, but not exactly the same as, a second spelling that is contained in second anchor text that is contained in the page;

selecting one of said first spelling and said second spelling based on a set of factors, wherein said set of factors includes whether (a) a frequency, with which said first spelling occurs in one or more results of a search for said second spelling but not for said first spelling, is greater than (b) a frequency with which said second spelling occurs in one or more results of a search for said a search for said first spelling but not for said second spelling; and suggesting, to a user, a selected one of said first spelling and said second spelling.

* * * * *

UNITED STATES PATENT AND TRADEMARK OFFICE
CERTIFICATE OF CORRECTION

PATENT NO. : 7,440,941 B1 Page 1 of 1
APPLICATION NO. : 10/364078
DATED : October 21, 2008
INVENTOR(S) : Borkovsky et al.

It is certified that error appears in the above-identified patent and that said Letters Patent is hereby corrected as shown below:

COLUMN 16
Claim 1: Line 34, delete "weight, to a first total count that is associated with said" and insert --weight, to a first total count that is associated--.

COLUMN 18
Claim 14: Line 16, delete "search for said a search for said first spelling but not" and insert --search for said first spelling but not--.

Signed and Sealed this

Seventeenth Day of March, 2009

JOHN DOLL
*Acting Director of the United States Patent and Trademark Office*